Patented Apr. 25, 1950

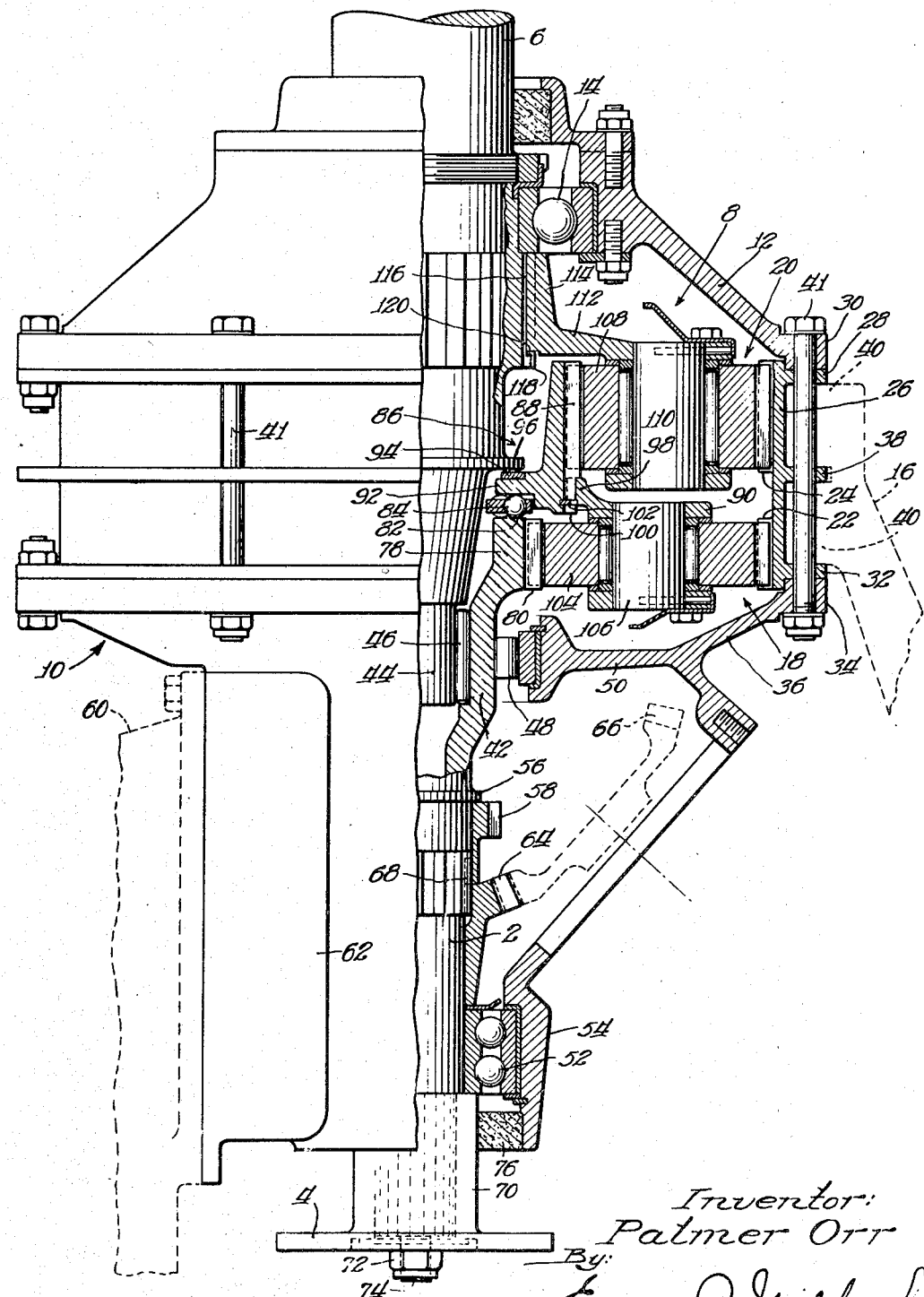

2,505,002

UNITED STATES PATENT OFFICE 2,505,002

PLANETARY GEARING

Palmer Orr, Muncie, Ind., assignor to Borg-Warner Corporation, Chicago, Ill., a corporation of Illinois Application March 18, 1943, Serial No. 479,617

10 Claims. (Cl. 74—801)

1

This invention relates to reduction gearing and has as its general object to provide a high ratio reduction gearing suitable for use in helicopters.

A further object of the invention is to provide a reduction gearing of the planetary type suitable for use in helicopters. A further object is to provide planetary gearing adapted for operation on a vertical axis. Another object is to provide two-stage planetary gearing adapted for operation on a vertical axis.

Another object of the invention is to provide planetary gearing having relatively simple and efficient means for supporting the gear elements of the planetary gearing for free planetary operation around a vertical axis. More specifically, it is my object to provide relatively simple antifriction bearing means for supporting a floating intermediate assembly of a pair of planetary gear trains superimposed one above the other on a vertical axis, including means for limiting upward movement of such floating intermediate assembly.

Another object of the invention is to provide a two-stage planetary gearing suitable for use in a helicopter, which gearing is of maximum compactness and simplicity. A further object is to provide a helicopter reduction gearing wherein the weight of the helicopter is transmitted to the upper portion of the gear housing (which in turn is supported from the sustaining rotor) through the medium of a ring gear which functions both as a part of the planetary gearing and as a portion of the housing. Another object is to provide a compact arrangement in a two-stage planetary gearing including a pair of ring gears of identical toothed contour, whereby they may be formed integrally and machined simultaneously These and other objects and features of this invention will become apparent from the following detailed description when taken together with the accompanying drawing.

The drawing shows a side elevation, partially in section, of a helicopter reduction gearing embodying the invention, together with associated helicopter parts.

As an example of one form in which the invention may be embodied, I have shown in the drawing a helicopter reduction gearing including a drive shaft 2 having at its lower end a coupling flange 4 adapted to receive a drive from the engine of the helicopter, a driven shaft 6 adapted to transmit the drive to the sustaining rotor of the helicopter, and two-stage planetary reduction gearing, indicated generally at 8, forming a high ratio reduction drive connection between the driving shaft 2 and driven shaft 6. The

2 gearing is enclosed in a housing, indicated generally at 10. The upper member 12 of the housing 10 is supported on the driven shaft 6 through the medium of a large ball bearing 14, and in turn supports the body of the helicopter through the medium of the conventional tripod 16.

The planetary gearing 8 comprises two planetary gear trains indicated generally at 18 and 20 respectively. The ring gears 22 and 24 of the respective gear trains are stationary and are formed integrally in a single sleeve 26 which forms the intermediate portion of the housing 10. The sleeve 26 has at its upper extremity a flange 28 which is fitted against a flange 30 on the lower extremity of the upper housing member 12. The sleeve 26 has a lower flange 32 which is fitted against a flange 34 on the lower member 36 on the housing 10. Supported upon the lower flange 32 and an intermediate flange 38 on the sleeve 26 are the fingers 40 of the tripod 16. Bolts 41 extend through the flanges 30, 28, 38, 32 and 34 and the fingers 40, securing the three members of the housing together and securing the tripod to the housing. Thus the body of the helicopter is supported from the upper member 12 of the housing through the medium of the ring gear sleeve 26.

The ring gears 22 and 24 have the same pitch diameter so as to permit the utilization of the ring gear sleeve in the manner aforesaid. This also makes it possible to make the teeth of identical contour and in axial alignment with each other so that they may be machined simultaneously, and it is contemplated that the teeth may be thus formed, although not necessarily so.

The drive shaft 2 has a tubular upper portion 42 in which is piloted the reduced lower end 44 of the driven shaft 6, bearing rollers 46 being interposed. The tubular portion 42 in turn is journalled, through the medium of a roller bearing 48, in an intermediate collar region 50 of the lower housing member 36. The lower end of the drive shaft 2 is journaled in a double ball bearing 52 mounted in a collar 54 at the lower end of the housing member 36. Intermediate the bearings 48 and 52 the drive shaft 2 is provided with a shoulder 56 against which is abutted a gear 58 for driving an oil pump (not shown) and tachometer (not shown). The oil reservoir, indicated in dotted lines at 60, communicates with an opening defined in a box 62 on one side of the lower housing member 36. Interposed between the gear 58 and the bearing 52 is a bevel gear 64 meshing with a bevel gear 66 which drives a small stabilizing propeller (not shown) for counteracting the torque of the sustaining rotor upon the helicopter body. The gears 58 and 64 are mounted on the shaft 2 and splined thereto as at 68. The weight of the drive shaft 2 and the parts supported thereby, is transmitted to the bearing 52 through the medium of the shoulder 56 and the gears 58 and 64. The parts thus mentioned are held in assembly by the hub portion 70 of the coupling flange 4, which is secured on the shaft 2 by means of a nut 72 threaded on the reduced lower end 74 of the shaft 2, the upper end of the hub engaging the inner race of the bearing 52. The bearing 52 may be protected by an oil seal 76 in the lower end of the collar 54.

The tubular upper portion of the drive shaft 2 has an enlarged upper end region 78 on which is formed the sun gear 80 of the lower planetary gear train 18. The upper end of the tubular shaft portion 78 is provided with a flat bearing surface 82. A ball thrust bearing 84 operates on the bearing surface 82. Supported on the thrust bearing 84 is the intermediate planetary assembly 86 which includes the upper sun gear 88 and the lower planet carrier 90. The sun gear 88 has a flange 92 provided with a flat lower bearing surface engaging the thrust bearing 84. Mounted on the upper side of the flange 92 is an anti-friction washer 94 which is adapted to cooperate with a flange 96 on the driven shaft 6 to limit upward movement of the intermediate planetary assembly 86.

The upper sun gear 88 and lower planet carrier 90 are separately formed, the lower planet carrier having a collar portion 98 which is splined upon reduced lower portions 100 of the teeth of the sun gear 88, and is supported by a snap ring 102 mounted in said reduced lower teeth portions 100.

The lower planetary gear train includes the sun gear 80, the ring gear 22, and the planet gears 104 which are journaled on trunnions 106 mounted in the carrier 90.

The upper planetary gear train 20 includes the sun gear 88, the ring gear 24, and the planet gears 108 which are journaled on trunnions 110 supported in the upper planet carrier 112. The latter has a hub portion 114 splined as at 116 to an enlarged splined portion 118 of the driven shaft 6, and supported upon a snap ring 120 mounted in the splined portion 118.

The planet gears 104 are larger in diameter than the planet gears 108 in order to bridge the radial space between the sun gear 80 and ring gear 22 which is greater than that between the sun gear 88 and ring gear 24. The sun gear 88 is larger in diameter than the sun gear 80, thereby accommodating the thrust bearing 84, the flange 96, and the enlarged splined portion 118, and handling the greater torque loads to which the sun gear 88 is subjected as contrasted to the sun gear 80. The enlarged diameter of the splined portion 118 likewise facilitates the handling of the high torque loads transmitted to the driven shaft 6.

In the operation of the transmission, power is transmitted through the shaft 2 to the sun gear 80 which transmits rotation to the carrier 90 at a reduced speed and increased torque, the planet gears 104 fulcruming against the stationary ring gear 22. The carrier 90 in turn transmits rotation through the sun gear 88 and planet gears 108 (fulcruming against the ring gear 24) to the upper carrier 112, a second reduction in speed and increase in torque being thereby effected.

From the carrier 112 the rotation is transmitted to the shaft 6 and then to the sustaining rotor of the helicopter. It is contemplated that the total reduction in speed and increase in torque shall be approximately 12 to 1.

I claim:

1. Planetary gearing including coaxial driving and driven shafts, one of said shafts having a tubular end portion and the other of said shafts having a reduced end portion piloted therein, planetary gearing forming a driving connection between said shafts, and a housing for said gearing comprising end sections and an intermediate section interposed between said end sections, said intermediate section comprising the ring gear member of said planetary gearing, and one of said housing sections having an extended end portion provided with a bearing in which one end of said tubular ended shaft is journaled and having, near its end connected to the ring gear, an inwardly extending collar portion in which said tubular shaft portion is journaled.

2. Planetary gearing adapted for operation on a vertical axis comprising axially aligned lower and upper shafts, a lower planetary gear train, an upper planetary gear train, an intermediate planetary assembly including the sun gear of the upper gear train and the carrier of the lower gear train, a radially extending flange on the intermediate planetary assembly, the upper end of said lower shaft terminating in proximity to the flange, bearing means between the said end of the lower shaft and the flange, and means on the upper shaft cooperating with the flange for limiting upward movement of the intermediate planetary assembly.

3. Planetary gearing as described in claim 2, said radially extending flange being formed on the sun gear of the upper gear train.

4. Planetary gearing as described in claim 2, said radially extending flange being formed on the sun gear of the upper gear train, and the last mentioned means comprising a radially extending member on the upper shaft which is fixed against axial movement on the upper shaft.

5. Planetary gearing as described in claim 2, said means on the upper shaft cooperating with the flange comprising an abutment formed as an integral part of the upper shaft and overlying the flange on the intermediate planetary assembly.

6. In a helicopter having a body portion and a supporting rotor, the combination of coaxial upper and lower shafts, said upper shaft being adapted for connection with the supporting rotor and having an enlarged splined portion, two-stage planetary gearing forming a driving connection between said shafts, said gearing including an upper planet carrier having a hub mounted on said splined portion, a thrust bearing mounted on said upper shaft above said hub and confining said hub against upward movement, a housing for said gearing supported upon said thrust bearing and adapted to transmit the weight of the helicopter body portion to said thrust bearing, a thrust bearing by means of which the lower end of said lower shaft is journaled in the lower portion of said housing, said planetary gearing including an upper sun gear and a lower planet carrier supported by the upper end of said lower shaft for rotation, a sun gear fixed to the upper end of said lower shaft, and ring gear means carried by and forming a part of the housing.

7. The combination of claim 6, including a stabilizer drive gear mounted on said lower shaft and forming a supporting connection between said lower thrust bearing and said lower shaft.

8. The combination of claim 6 wherein the upper end of said lower shaft is formed with a tubular portion in which the lower end of said upper shaft is piloted, a shoulder on said lower shaft below said tubular portion, and a stabilizer drive gear and oil pump drive gear mounted on said lower shaft and forming a supporting connection between said shoulder and said lower thrust bearing.

9. The combination of claim 6 wherein said lower shaft has at its upper end a tubular portion in which the lower end of said upper shaft is piloted and is formed with a shoulder, means extending inwardly from said housing forming a bearing for the upper portion of said lower shaft, and stabilizer and oil pump gears mounted on said lower shaft forming a supporting connection between said lower bearing and said shoulder.

10. In a helicopter, the combination of a helicopter body portion, a supporting rotor, coaxial upper and lower shafts, said upper shaft being connected with the supporting rotor and having an enlarged splined portion, two stage planetary gearing forming a driving connection between said shafts, said gearing including an upper planet carrier having a hub mounted on said splined portion, a thrust bearing mounted on said upper shaft above said hub and confining said hub against upward movement, a housing for said gearing supported upon said thrust bearing and connected with said helicopter body to transmit the weight of said body to said thrust bearing, a thrust bearing by means of which the lower end of said lower shaft is journaled in the lower portion of said housing, said planetary gearing including an upper sun gear and a lower planet carrier supported by the upper end of said lower shaft for rotation, a sun gear fixed to the upper end of said lower shaft, and ring gear means carried by and forming a part of the housing and connected with the helicopter body portion.

PALMER ORR.

REFERENCES CITED

The following references are of record in the file of this patent:

UNITED STATES PATENTS

| Number | Name | Date |
| --- | --- | --- |
| 941,925 | James | Nov. 30, 1909 |
| 986,588 | O'Kelly | Mar. 14, 1911 |
| 1,213,427 | Shepard | Jan. 23, 1917 |
| 1,320,530 | Buehler | Nov. 4, 1919 |
| 1,632,123 | Else | June 14, 1927 |
| 1,968,604 | Hertz | July 31, 1934 |
| 2,135,073 | Gerhardt et al. | Nov. 1, 1938 |
| 2,186,064 | Dekker | Jan. 9, 1940 |
| 2,212,731 | Dunn | Aug. 27, 1940 |
| 2,236,657 | Webb | Apr. 1, 1941 |
| 2,244,668 | Barnes | June 10, 1941 |
| 2,252,544 | Bennett | Aug. 12, 1941 |
| 2,261,104 | Birkigt | Nov. 4, 1941 |
| 2,295,076 | Cochran | Sept. 8, 1942 |
| 2,301,497 | Alspaugh | Nov. 10, 1942 |
| 2,340,241 | Woods | Jan. 25, 1944 |
| 2,364,096 | Platt | Dec. 5, 1944 |

FOREIGN PATENTS

| Number | Country | Date |
| --- | --- | --- |
| 397,338 | Great Britain | Aug. 24, 1933 |